FIG. 2

Inventor
Donald E. Hooker
By
[signature]
Atty

United States Patent Office 3,250,363
Patented May 10, 1966

3,250,363
DISPENSING CONTROL APPARATUS
Donald E. Hooker, Wilmette, Ill., assignor to Automatic Canteen Company of America, Chicago, Ill., a corporation of Delaware
Filed Apr. 21, 1964, Ser. No. 361,425
16 Claims. (Cl. 194—10)

The present invention relates to the control of dispensing apparatus and more particularly where such apparatus is to pay out correct change for a machine such as a merchandising machine.

The invention has as its object to provide a new and improved coinage control and coin payout apparatus for use in a vending or merchandising machine.

It is a further object to provide an improved apparatus to control the vending of a selected article, and the payout of the correct amount of change in many denominations.

The invention has as another object to provide an improved coin or check-actuated register which cumulates credit for a coin or check submitted to the machine, and which automatically dispenses change in the form of the least number of coins necessary.

It is a further object of the invention to provide for use in a merchandising machine having a plurality of articles for sale at a plurality of prices, a credit storage system which initiates the vending of a selected article and returns the difference between the stored credit and the sale price in a minimum number of coins.

A still further object of the invention resides in an apparatus whereby a deficiency in the amount of coins of larger denomination is sensed and the next lesser amount of coins which would constitute the amount to be paid out, are in fact paid out.

To effect these and other objects, the invention provides a control apparatus for a machine which may generally be of the type shown in any of the following patents: (1) Escapement Wheel Coin Totalizer, U.S. Patent No. 2,972,400, issued on February 21, 1961, to C. Gabrielson (covers the addition of credit in a coin-actuated totalizer with no change payout described); (2) Electromechanical Totalizer, U.S. Patent No. 2,996,163, issued on August 15, 1961, to H. W. Baker, Jr. et al. (covers the addition of credit in a coin-actuated totalizer with change payout in nickels); (3) Change-Making Machine, U.S. Patent No. 3,080,035, issued on March 5, 1963, to J. Diaz (covers a dollar bill actuated totalizer which pays out change as the difference between $1.00 and the sale price).

The present control apparatus utilizes a totalizer which may physically employ a rotatable credit wheel operated step-by-step in one direction to add credit and in the other direction to subtract credit. The credit wheel is operated in the add direction on the insertion of coins in the machine. Quite clearly, the credit may be added in response to the insertion of a currency note, as shown by the Diaz patent or to a check or credit card. The credit wheel is stepped in the subtract direction as change is paid out or as an article of merchandise is vended or on the occurrence of both. Change is paid out in the largest denomination of the remaining credit. Assuming for example that 50¢ had been inserted in the machine for the purchase of a 10¢ article, 40¢ of credit would remain after vending of a selected article had been initiated. The register or totalizer would pay out in sequence a nickel, a dime, and a quarter. If the supply of quarters were depleted, a nickel and two dimes would be paid out to complete the 40¢ payout.

The apparatus, as shown herein, utilizes three sale prices (price lines) although more prices could be utilized with but minor additions. In addition, only a maximum credit storage of 50¢ has been shown for FIGURES 1 and 2, although it is clear that with the principle as disclosed, the apparatus and its control circuitry could readily be enlarged as required in the manner shown in FIGURE 3.

The invention both as to its organization and principle of operation together with further objects and advantages thereof will best be understood by reference to the following specification taken in connection with the accompanying drawings in which.

Figure 1:
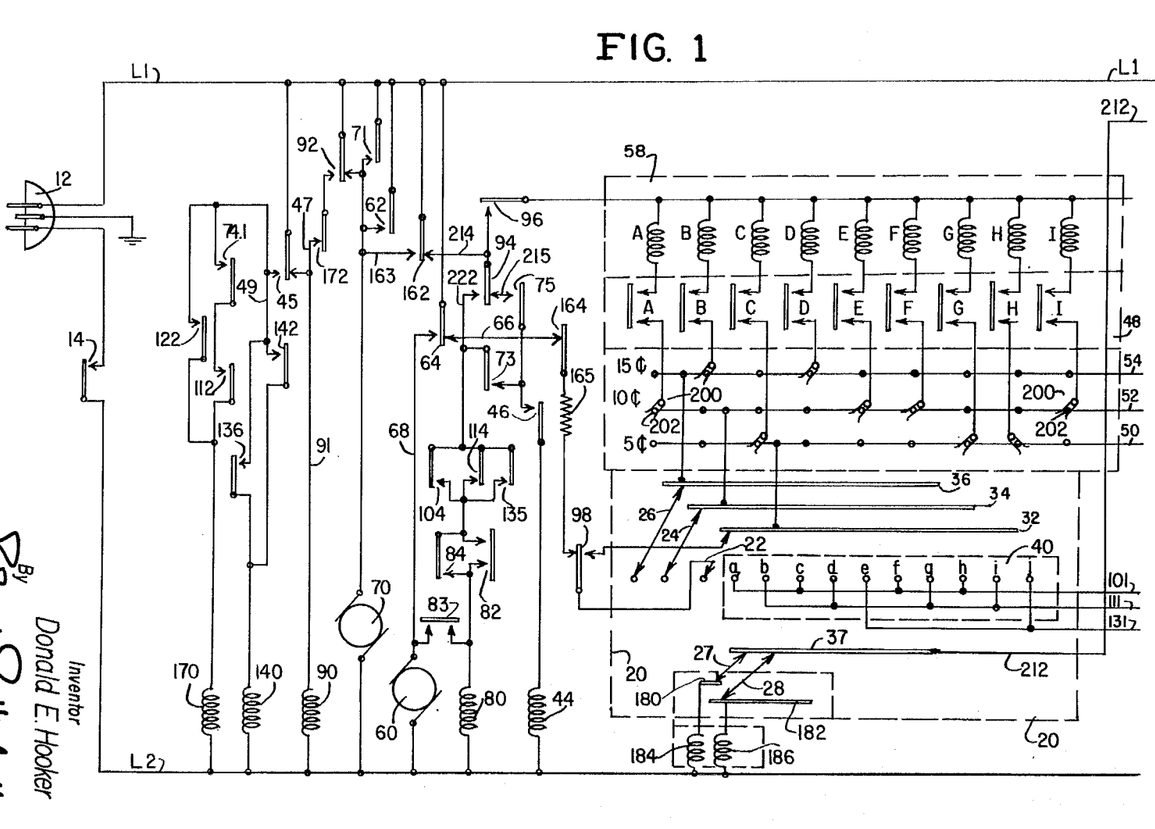
FIGURES 1 and 2, when placed in side-by-side relation (with FIGURE 2 to the right of FIGURE 1) comprise a schematic diagram of a control circuit for a 50¢ maximum credit apparatus utilizing the principles of the present invention.
Figure 2:
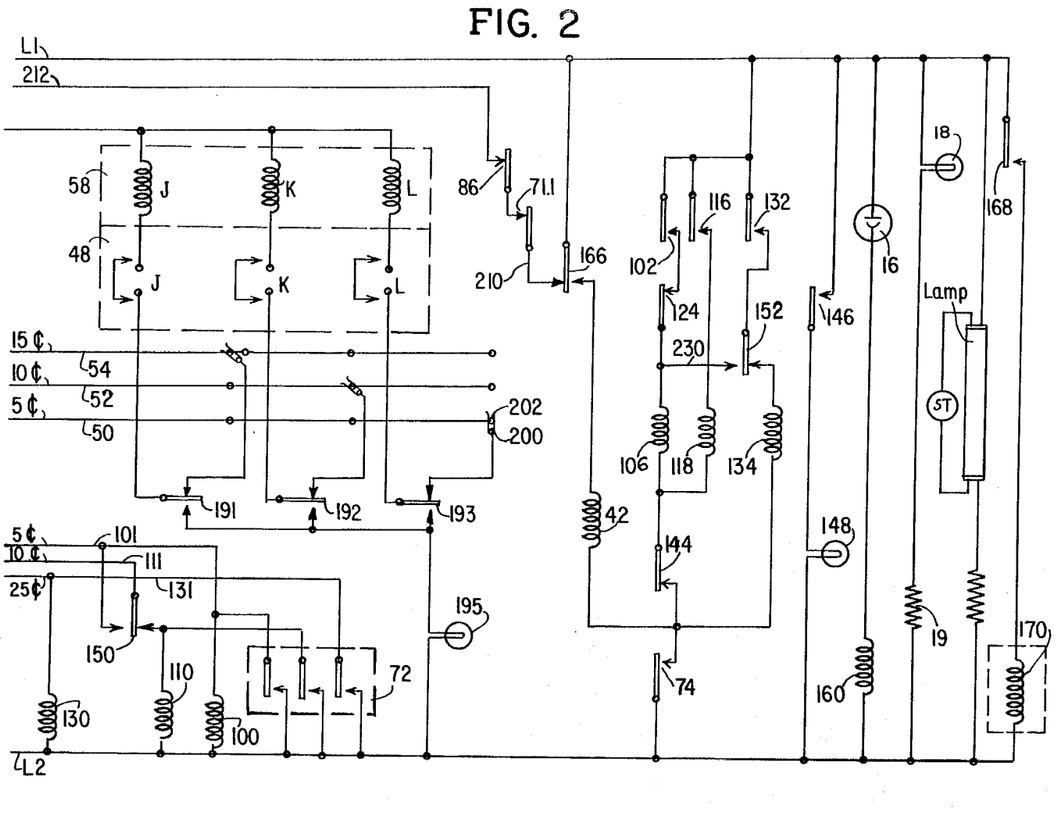

Now turning to the apparatus of FIGURES 1 and 2 in detail, there is shown in detail a schematic drawing of a control circuit for use with an apparatus for storing received credit and for dispensing a proper amount of change alone or in addition to the vending of a selected article. In the circuit, there can be seen a standard grounded plug 12 which serves to connect the circuit components to an 110 volt, 60 cycle, A.C. source. From the plug, a main pair of conductors, L1 and L2, transmit current to the control circuit. A conventional ON–OFF switch 14 is placed in series in lead L2 to shut down the machine when not in use.

It should be noted that all switches and contacts are shown in their normal or unoperated form consistent with usual drafting practice, the detached contact form having been used herein to simplify the disclosure.

The coin credit function shown herein may be performed in a manner similar in operation to that employed by the present inventor in his co-pending application Ser. No. 347,757, filed February 27, 1964, now Patent No. 3,211,161, for a Coin Register. In the apparatus shown in that system, a lamp 18 with its resistor 19 passes light through coin chutes (not shown here). The light is interrupted by passing coins to trigger a photo-electric cell, here numbered 16, to control the transmission of one or more impulses to an electromagnetic rotary stepper 20 for adding or storing credit. The stepper 20, as shown herein, has three mutually insulated wipers 22, 24, and 26, one for each article sale price, and two separate lockout wipers 27 and 28. All of these wipers are moved jointly across their respective continuous commutator strips 32, 34, 36, and 37 (the last-mentioned common to both wipers 27 and 28) to complete various circuits from the commutator strips to the respective stationary contact sets 40 and 38. These contact sets and the commutator strips are arrayed arcuately about the wiper rotative axis in known fashion. The switch configuration is shown herein in straight line or flattened form, rather than arcuately, for drafting and understanding simplicity.

To drive the wipers step-by-step across the stationary contacts a–j of set 40 in the direction to add credit (to the right), there is provided what has been called an add solenoid or coil 42. To subtract credit, a second coil or solenoid 44 acts to rotate the wipers to the left, the direction opposite that for addition. It is contemplated that the rotary stepper used herein is one which uses indirect or escapement drive, as such steppers are quite prevalent in the art. The stepper has two sets of off-normal contacts 45 and 46 which assume a normal condition (as shown) with the stepper in the home position (indicating no credit stored), and assume an off-normal condition when the wipers are displaced from the home position, indicating stored credit. In the normal condition, contact set 45 is closed to lead 47, and set 46 is open; while in the off-normal condition, set 45 is open to lead 47 and is closed to its other conductor 49, and set 46 closes a circuit to subtract coil 44.

As mentioned previously, the register mechanism contemplated herein is similar in operation to that shown in the cited co-pending application by the present inventor, although it is clear that the present credit storage and dispense control could as readily be applied to a conventional credit storage system of the type shown in the earlier cited patents or as are generally known in the art at this time.

The apparatus shown herein utilizes three separate sale prices for articles to be vended, the prices being determined by the connection of the individual manual actuatable selector switches of switch set 48 to the respective price lines 50, 52, and 54 which for purposes of example have been selected as 5¢, 10¢, and 15¢, respectively. There have been shown a number of selector switches, designated A–L, in the set 48, the specific number of which may vary dependent on the number of articles to be vended from the machine, each of these switches representing an individual article which may be selected for vending by the purchaser. Each switch has in series therewith its individual solenoid, the set of select solenoids generally numbered 58 (A–L). When one of these solenoids is energized, it produces a mechanical motion of any known type for directing the selection of the particular article to be vended. These solenoids are each connected in parallel, each in series with its respective selector switch of set 48. The solenoid coils are of low impedance and in order that one of these solenoids operates, it must be connected across the line leads with but little series resistance. With appreciable series resistance, none of these solenoids can operate.

To effect the actual vending of the selected article, there is provided a vend motor 60 which is electrically energized to operate a suitable vend mechanism (not shown) to emit the article selected by the purchaser as denoted by actuated selector switch of set 48. The vend motor has a number of cam-actuated switch contact sets 62 and 64. Contact set 62 is of the type which is either open or closed, open normally and closed when the vend motor is energized. These contacts 62 may be integral to the motor 60 or may be slave relay contacts (not shown) which are initially closed on the energization of the vend motor and whose release time is delayed for a finite period which much exceed the duration of the maximum number of timing cycles required to subtract credit. Contact set 64 has two positions, a normal one closing a non-vending control circuit to lead 66; and an operated position closing a circuit to conductor 68 for locking the vend motor 60 in its operated state. Both contact sets once operated, remain in that condition until they are returned to their normal condition at the conclusion of a vend cycle, in a generally known manner.

To provide triggering impulses for controlling both the crediting and the dispensing cycles, a timing motor 70 is provided. This motor has a plurality of cam-actuated contact sets which are operated in sequence to effect the necessary timing sequence of operations. The timing sequence includes five periods of operation, as will be described more fully.

A first of these cam-actuated contact sets includes one set 71 which is normally open and another set 71.1 which is normally closed, and are reversed on the operation of the timing motor 70. These contacts once operated, remain in their operated condition for the duration of the timing operation. Contacts 71 once closed, maintain the timing motor 70 operated, and contacts 71.1 once operated, act to reject the insertion of further credit, as will be explained. A timed period after contact sets 71 and 71.1 have operated, normally open timing motor contact set 72 closes. Next, timing motor contact set 73 closes, and at that time, set 72 opens. Similarly, set 73 opens and following a dwell period, contact sets 74 and 74.1 close simultaneously. A timed period thereafter, contacts 74 and 74.1 open, followed by closure of contact set 75. Shortly thereafter, all operated contact sets return to their normal condition, to end a timing cycle. A complete timing cycle is of comparatively short duration and may last approximately one second. Such timing motors and timing cam contact sets are quite well-known in the vending art, and the physical means of effecting such timing sequences need not be set out herein.

In addition, the apparatus includes a selector controlled solenoid 80, which is energized following a selection by the purchaser of an article to be vended and following closure of switch contacts 82 and 83. Switch contacts 82 and 83 are common to all the selector switch sets 48 and are physically closed in any known manner by the depression of a selector switch of set 48. Operation of solenoid 80 closes its own locking contact set 84 to close a hold path for solenoid 80. Solenoid 80 remains operated for the duration of the dispensing and acts to maintain contacts 86 open. These last-mentioned contacts are in series with timing motor contacts 71.1 in the coin rejection circuit previously referred to.

An escrow coil or relay 90 is provided which is normally energized over a path through a lead 91, lead 47, and off-normal contacts 45 (in the home position of stepper 20, indicating no credit stored). This relay 90 has a number of escrow contact sets 92, 94, 96, and 98 which are all shown in the unoperated state, the position assumed when the relay 90 is de-energized. These contacts in the unoperated position lock out vending and control a full coin return payout, and in the operated position complete various vend circuits and change payout circuits.

For each coin denomination which is to be paid out, there is provided a separate payout solenoid and a denomination relay. These denomination relays are of the fast-to-release type for reasons which will become apparent later in this description. These denomination relays are connected to respective ones of the stationary contacts $a$–$j$ of set 40. For the lowest denomination usable in this apparatus, called the unit denomination (5¢), there is provided a 5¢ denomination relay 100, electrically connected in multiple to contacts $a$, $c$, $f$, and $h$ of set 40 and 5¢ demonination conductor 101. This relay has a first set of contacts 102 and a second set of contacts 104. The first set of these contacts 102 is in series with the coil of the 5¢ payout solenoid 106. Solenoid 106, when energized, physically ejects a single nickel from a conventional nickel storage tube. The specific ejection mechanism actuated by the payout solenoid may be of any conventional type.

The remaining multiple denomination coins to be paid out, i.e., 10¢ and 25¢, each has its individual, lower denomination cut-off relay in addition to its denomination relay and payout solenoid. Controlling the dime payout is a 10¢ relay 110 electrically connected to contacts $b$, $d$, $g$, and $i$ of set 40 through 10¢ denomination conductor 111. This relay has a first and a second set of normally open contacts 112 and 114. Contacts 114 close on energization of relay 110 to close a path to solenoid 80 parallel to contacts 104 of 5¢ relay 100. Contacts 116 are in the circuit to the coil of dime payout solenoid 118; and contacts 112 close a circuit to the coil of dime cut-off relay 120. Dime cut-off relay has a normally open set of contacts 122 partially parallel with contact set 112; contact set 122 providing a lock path for its own relay coil 120. In addition, relay 120 has a normally closed set of contacts 124 in the operating path of 5¢ payout solenoid 106. These contacts 124, when open, interrupt the path to nickel payout solenoid 106. Thus, in normal operation, once relay 120 has operated, further nickel payouts cannot occur.

The quarter payout network includes a 25¢ denomination relay 130 connected to contacts *e* and *j* of set 40 and 25¢ denomination conductor 131. Relay 130 has a first set of contacts 132 in series with the 25¢ payout solenoid 134. A second set of contacts 135 of relay 130 is normally open forming a parallel combination with contact sets 104 and 114 to vend motor 60. A further set of contacts 136 operated by solenoid 134 forms a parallel combination with contacts 112 and 122, the combination being in series with the coil of quarter cut-off relay 140. Relay 140 has a set of normally open contacts 142, which close on its energization to lock relay 140 operated during the operative cycle. A second, normally closed contact set 144 of relay 140 is in the operating path to both 10¢ and 5¢ payout solenoid 118 and 106. When contacts 144 open, nickel payout control solenoid 106 and dime payout control solenoid 118 are locked against possible operation for the duration of a dispense cycle.

Each of the coin tubes for the various denomination coins has its own set of empty contacts. Each of these contacts is actuated by a respective conventional feeler switch (not shown) near the base of its coin storage tube. The switch contacts 146 of the 5¢ tube are open when there are coins in the tube, and close prior to the depletion of the nickels in the nickel tube to illuminate lamp 148. The lamp 148 on being illuminated lights a sign visible exteriorly of the machine, reading "Use Correct Change."

The dime tube switch has a two-position contact set 150, the armature of which is connected to 10¢ conductor 111 and contacts *b*, *d*, *g*, and *i* of set 40. The armature of set 150 assumes a normal position closing the circuit to the 10¢ denomination relay 110 when sufficient dimes are stored in the dime tube, and on occurrence of a condition wherein the tube is almost empty, these contacts open the circuit to 10¢ denomination relay 110; and switch the circuit from 10¢ conductor 111 to nickel relay 100. Similarly, the quarter tube switch has a two-position contact set 152 normally closing a path to the quarter payout solenoid 134, and prior to the depletion of the quarters in the quarter tube, contact set 152 will instead close an alternate circuit to the 5¢ payout solenoid 106.

The circuit further includes a coin detect relay 160 which is used in the addition of credit and includes a number of contacts. This relay is normally maintained de-energized by the high resistance of photo-electric cell 16 which is in series with the coil of relay 160. On sensing of a coin to be credited, the light to the cell is interrupted (as described in detail in the cited co-pending application of the present inventor) decreasing the cell resistance to energize coin detect relay 160. Relay 160 has a first set of contacts 162, the armature of which is connected to lead L1, and which normally rests in a first position, and which has a second or energized position closed to lead 163 and timing motor 70. A second set of contacts 164 is normally closed to complete a circuit through resistor 165 to contacts 98 to control full coin return payout. A third set of contacts 166 of relay 160 controls the actuation of add coil 42 in that the armature of this contact set is normally closed to its back contact to close the coin accept circuit to contacts 71.1. On energization of relay 160, this circuit is opened, and an alternate circuit is closed to the add credit coil 42. A final set of contacts 168 of relay 160 is normally open, and on operation closes a circuit to the engage rack coil 170 to motively couple the coin arresting gate to the stepper in the manner set out in the cited co-pending application.

Preferably with the apparatus shown herein, accepted nickels, dimes, and quarters would be channeled to the respective denomination storage tubes following acceptance, evaluation, and credit registration. One result achieved by this early acceptance of the coins is that the supply of change is constantly replenished. The mechanics of diverting coins into payout tubes is generally known and is not shown herein.

To utilize the direct channeling of coins to the respective storage tubes, means must be provided to dispense the full amount inserted, when the purchaser, once having inserted his coins, changes his mind about making a selection. To provide this feature, the present machine acts to return the full amount deposited, once the purchaser changes his mind and effectuates this change by actuating a coin return lever (not shown). The coin return switch controls this coin dispensing through its normally closed contact set 172, as will be described in greater detail.

Within the rotary stepper 20, there are three separate combined vend and payout control wipers 22, 24, and 26 which move jointly across the stationary contacts 40*a–j*. The wipers are each insulated from one another and each is connected to a respective price line commutator (32, 34, 36) in a manner retaining contact therewith during wiper movement. The wipers normally rest spaced apart a contact spacing distance equivalent to the difference between the sale price represented by one wiper and the sale price represented by the adjacent wiper or wipers. In the example shown herein, the sale prices are spaced by single increments (unit denomination, 5¢) spacings and will rest on adjacent ones of the stationary contacts. In the normal position, the leading wiper in the direction of movement, 5¢ control wiper 22 rests one step back of the first or *a* stationary contact of contact set 40. The second wiper, 10¢ control wiper 24, rests a second step back, and the third wiper, 15¢ control wiper 26, rests one step further back. The wipers move to the right (as shown in FIGURE 1) to register credit at the rate of one step for each unit denomination or increment. Thus, on insertion of a nickel, the wipers all advance one step; on a dime two steps; on a quarter five steps; and on a half-dollar ten steps. In addition, the system will accept two nickels to move two credit steps, three nickels for three steps, a nickel and a dime for three credit steps, and two dimes for four steps.

To summarily reject coins other than those previously designated as acceptable for the sale prices used in the present example, the apparatus of wipers 27 and 28 come into play. These wipers are mounted for rotation jointly with the other wipers 22, 24, and 26. Wipers 27 and 28 commonly ride on arcuate commutator 37 of stepper 20 and are normally in contact with the separate stationary contacts 180 and 182 of contact set 38. Stationary contact 180 is of single contact extent. Wiper 27 is so positioned that with stepper 20 in its home position a circuit is completed from contacts 38, through wiper 27 and contact 180 to coil 184. When the wipers step off the home position, wiper 27 loses its engagement with contact 180 and opens the path to coil 184. Stationary contact 182 is of longer extent, extending from the normal or unoperated contact through the three adjacent contacts to complete a path to coil 186. For three steps of the wipers, wiper 28 retains engagement with stationary contact 182 and loses its engagement on the fourth step (20¢ credit stored).

Coils 184 and 186 are coils used in a coin rejector and and their functioning is well-known in the coin acceptance and vending fields. When these coils are energized, they allow coins to be accepted and be passed from a slug rejector or coin acceptor to the evaluator for registration of credit and coin collection. These coils, when de-energized, actuate a lever arm in the coin passages to summarily reject inserted coins. Coil 184 controls a lever (not shown) in the 50¢ coin passage and will reject half-dollars once a single coin has been registered. Coil 186 controls levers (not shown) in all other coin passages, so that all additional coins will be summarily rejected and returned to the customer once fifteen cents worth of credit has been registered. These coils 184 and 186 function to reject excess coins and to return these coins to the purchaser through a standard coin reject chute. Coils 184 and 186 also act to interlock the facets of the system so no coins may be inserted while either a crediting (addition) cycle or a dispensing (subtraction) cycle is in process.

To complete the description of the use of this invention in a typical apparatus, it may be understood that two different types of articles may be vended from the machine. For articles to be vended in response to a selection of any switch of selector switch 48A–I, the article is visible to the viewer through viewing windows (not shown). In such selections, an empty condition of a particular selector is visible to the viewer, so he will not insert coinage to select a depleted article. Other articles indicated by selections J–L are not visible to the viewer and, as a result, individual empty switch contacts 191, 192, and 193 are provided to close on occurrence of a depletion of one of these selections to close a circuit to empty warning light 195. Vend solenoids J–L of price line 50 cannot operate in series with lamp 195, and on selection of an empty selection J–L (the vend motor not having completed its starting circuit), a second selection may be made or the coin return lever may be actuated.

It should be noted in this regard that the connections from the selector switches of set 48 to the respective price lines 50, 52, and 54 are of the manually disconnectable type, so that the price to be charged for an article may readily be changed as desired. To change the price of an article at a selection, U-shaped, spring-urged connector 200 is removed from contact with binding post 202 at the old price line, and is connected to the desired price line binding post. In this way, prices for selections may be varied, as desired, by the machine operator or owner by this disconnection and subsequent connection to the desired price line.

Since the main emphasis of the disclosure herein is in the payout circuit, the add or crediting will be described quickly and the dispensing cycle in greater detail. For this purpose, we will explain the crediting of a half-dollar, and it will be understood that other crediting operations for greater or lesser amounts will be similar in principle.

At the start, the apparatus is in its normal condition; all article storage compartments are at least partially loaded and the change payout tubes are also at least partially full. At this time, coin detect relay 160 is energized and escrow relay 90 is also energized. Lamp 18 is illuminated and light passes uninterruptedly to photo-electric cell 16. At this time, contacts 166 of relay 160 are closed to lead 210 to complete a path therethrough from lead L1 and the closed combination of set 166 to closed contact sets 71.1 and 86, lead 212, to commutator 37. From commutator 37 parallel paths are completed over wipers 27 and 28 to coils 184 and 186, maintaining these coils energized to accept coins in the manner previously described.

A coin, which we will assume to be a 50¢ piece, is inserted into the machine, and passes between lamp 18 and photo cell 16 (in the manner fully described in the cited co-pending application). As the light of the photo cell is interrupted, its resistance decreases and coin detect relay 160 is energized. The coin detect relay on energization closes its contacts 162 to complete an obvious path from lead L1 to lead 163, timing motor 70, and lead L2. In this manner, the timing motor is operated and closes its cam actuated sets sequentially. Contacts 166 restore to prepare a path to the add coil 42 which is now open at contacts 74. This reversal at contacts 166 opens the circuits to de-energize both coils 184 and 186 and summarily reject all coins which are inserted during a credit storage period. Contacts 168 on restoration close an obvious path to coil 170 to couple the coin registry gate (not shown) to rotary stepper 20 for joint movement therewith.

Timing motor 70 once actuated, closes its first cam contact set 71 which locks the motor 70 operated for the duration of its timing cycle. The duration of this cycle is five periods in length, the last integer of each timing cam contact numeral representing the period during which the particular contacts are initially operated. The timing motor continues through its cycle and because of various circuits which are open at this time, no other activity occurs until during the fourth period cam switch contacts 74 close to energize add coil 42 through restored contact sets 166. Following the end of this period, contacts 74 open and the rotary stepper wipers are moved one step to the right, indicating the crediting of a unit denomination (5¢). In repetitive fashion, the timing motor continues through ten cycles until 50¢ worth of credit is stored and the half-dollar is passed to the coin collection box in a conventional manner.

At this time, wiper 22 is in engagement with the tenth stationary contact $j$ of set 40, connected to 25¢ denomination conductor 131. Wiper 24 engages the adjacent ninth contact $i$, connected to 10¢ denomination conductor 111, and the last of these wipers, 26, engages the eighth stationary contact $h$, connected to the 5¢ denomination conductor 101. The remaining wipers 27 and 28 have also stepped accordingly and have opened the circuits to their respective coils 184 and 186, as previously described. The functioning of coils 184 and 186 is not relevant to the following discussion and will be omitted from further consideration herein.

Once any amount of credit has been stored and the wipers have stepped from their home or normal position, off-normal contacts 45 and 46 reverse their previous connections. By this reversal, the original operating path to escrow relay 90 is opened, but relay 90 remains energized over its hold path through its own contact set 92 and the closed coin return lever contacts 172. At contacts 46, a preparatory circuit to subtract coil 44 is closed. The inserted coin having been collected, coin detector relay 160 is re-energized.

A number of possible choices are available to the prospective purchaser as follows: (1) He may actuate the coin return lever and receive in return for his half-dollar two quarters in change; (2) he may select a 5¢ item and receive 45¢ in change in the form of two dimes and one quarter; (3) he may select a 10¢ item and receive 40¢ in change in the form of one nickel, one dime, and one quarter; or (4) he may select a 15¢ item and receive change in the form of one dime and one quarter to total his 35¢ in change. These possibilities will now be discussed in greater detail.

In the first of these possible situations, the prospective purchaser has either changed his mind, or he desires change for his half-dollar, and actuates the coin return lever. The coin return lever on actuation opens its contacts 172 to release the hold path to escrow relay 90, which then restores. Restoration of this relay switches contact set 94 to a closure to conductor 215 and opens the circuit to conductor 222 in series with vend motor 60. Contact set 96 releases to open the path to the individual select solenoids. Opening of these two circuits bars the possible operation of a vend cycle and maintains the vending circuits inoperative. Contact set 98 closes to place the leading wiper set 22 in control of the payout function.

Restoration of the escrow relay 90 restores its contacts 92 to re-energize timing motor 70. Timing motor 70 locks itself operated at contacts 71 and begins its timing sequence. As the timing cycle continues, timing contacts 72 close and shunt the denomination relays 100, 110, and 130 out of operation. This shunting of the denomination relays is of importance only during a vending cycle, and is of no consequence in a change return cycle. The timing cycle then continues through the next period in which contacts 73 close a partial circuit open at contacts 94 leading to the subtract coil 44. The timing cycle proceeds into the next phase in which contact sets 74 and 74.1 both close. The action of contact set 74.1 is merely preparatory at this time and is of no consequence at this time.

It should be remembered that contacts 72 have now opened the shunt about the denomination relays and relay 130 is energized over a path which may be traced from lead L2 through the coil of relay 130, 25¢ denomination conductor 131, the tenth stationary contact *i* of set 40, wiper 22, the closed contact set 98 leading to resistor 165, closed coin detect relay contact 164, lead 66, and contact set 64 to lead L1. Relay 130 then closes its contacts 132 to complete a circuit to the 25¢ payout solenoid 134 through now closed contacts 74. Closure of this last-mentioned circuit acts to pay out one quarter to the prospective purchaser. Concurrently with the start of payout of the quarter, contacts 136 close to complete a path through the now closed off-normal contact set 45. The 25¢ cut-off relay 140 is energized over this path and closes its contacts 142 to lock itself operated over contacts 45. In this way, the 25¢ cut-off relay will remain energized until the wipers 22, 24, and 26 have restored to their home position. Closure of relay 140 further opens its contacts 144 in one circuit to the lower denomination payout solenoids 106 and 118. Once a quarter has been paid out, payout of lesser denomination coins is thereby prevented.

The timing cycle continues into the next or fifth period during which contact set 75 closes to complete the operating path to subtract coil 44. This circuit may be traced from lead L2 and coil 44 through closed off-normal contacts 46, closed contacts 75, 94, and 162 to lead L1. The timing cycle then continues opening all previously closed cam contacts and the wiper assembly is stepped backwardly (to the left, as it would appear in FIGURE 1). The timing cycle will be energized once again over closed contacts 92 and will sequence again by locking itself operated during the first period and performing no active function during the second and third periods of the timing sequence. During the fourth sequence, a circuit will be closed to 10¢ relay 110. This circuit is completed from lead L2 through relay 110, contacts 150, 10¢ denomination conductor 111, the ninth stationary contact *i*, wiper set 22, escrow relay contacts 98, resistor 165, and contacts 164 and 64. This closure of relay 110 closes a set of contacts 116 in the energizing circuit of 10¢ payout solenoid 118. However, this circuit is open at contacts 144 which had been locked operated by the operation of relay 140. Therefore, no dime payout can occur at this time and the operating sequence continues into the fifth step during which subtract coil 44 is energized, following which the wipers are stepped backwardly one step to engage the eighth stationary contact *h* of set 40 connected to 5¢ denomination conductor 101.

A repetition of the last-mentioned cycle occurs during which 5¢ relay 100 is energized, but is ineffective due to the open contact set 144 which will not allow payout of a nickel. The timing motor continues to sequence through two more ineffective cycles during which the wipers are stepped back two steps. No other dispensing of any kind takes place during these two cycles and the apparatus now shows 25¢ worth of credit remaining.

The next important function of this change return occurs when the lead wiper 22 reaches the fifth contact *e* of set 40 during a continuing timing cycle. As in the previously described cycles, the timing cycle locks itself operated over contacts 71 during the first period of the timing cycle following which second and third periods occur. During the second and third periods, no effective action is produced. During the fourth timing period, a circuit is closed to relay 130, and relay 130 closes its contacts 132 to complete a circuit through the 25¢ payout solenoid 134 through now closed cam contacts 174. At this time, a quarter is paid out by the action of this solenoid. 25¢ cut-off relay 140 remains energized, so that no change occurs in that portion of the circuit. The timing cycle then progresses into the fifth period wherein subtract coil 44 is energized. At the end of the cycle, coil 44 is de-energized to step the wipers back one step, the lead wiper 22 then resting on the fourth contact *d* of set 40.

At this time, two quarters have been paid out for the inserted 50¢ piece. The dispensing for this cycle is complete, and the rotary stepper 20 must return itself to its home or normal position without effecting any other action. The return to the home position occurs in a manner similar to that previously described for the return or subtract credit steps occurring from the ninth to the fifth return steps. During all these return steps, contacts 144 of the 25¢ cut-off relay remain open, thereby disenabling the 5¢ payout solenoid 106 and the 10¢ payout solenoid 118. This disenabling is maintained until the rotary stepper reaches its home position at which time off-normal contacts 45 and 46 restore. During the entire subtraction of credit described, no vending can occur, since the escrow relay 90 has disenabled the vend motor 60 at open contacts 94 and maintained solenoids 58 inoperative at open contacts 96.

As the second possible operation mentioned previously, once 50¢ worth of credit has been stored, the customer may select a 5¢ item to be vended and thereafter receive 45¢ in change. This 45¢ will be dispensed in the form of two dimes and a quarter. Starting with the condition in which 50¢ worth of credit has been stored, the lead wiper 22 is again resting on the tenth contact *j*, with wiper 24 resting on the ninth contact *i*, and wiper 26 resting on the eighth contact *h*. At this time, off-normal contacts 45 are closed to conductor 49, and off-normal contacts 46 are closed. Coin detect relay 160 is operated as is escrow relay 90. As previously described, this escrow relay 90 is originally energized by contacts 45 when in their normal or home position, and once energized, this relay locks itself operated over its own contacts 92. As set out, exemplarily, the articles represented by the selectors C, G, H, and L are connected for sale at 5¢ to price line 50. This can be verified by tracing the connection leading from the respective listed selector switches of set 48 to the 5¢ price line 50.

Assuming that the purchaser wishes to select an article represented by the selector switch C, he then depresses the switch C of set 48 to close the path across the C contacts. This closure only affects the 5¢ price line and wiper 22; wipers 24 and 26 being open across selector switches 48. A path is thus closed from lead L1 through operated contacts 162, conductor 214, closed contacts 96, solenoid 58C, closed switch contacts 48C, 5¢ price line 50, commutator 32, closed contacts 98, wiper 22, tenth contact *j* of stationary contact set 40, denomination conductor 131, and 25¢ denomination relay 130 to lead L2. Solenoid 58C will not operate over this path while relay 130 will, however. Relay 130 on operation closes its contacts 135 to energize vend motor 60.

It should be noted that the contacts of manual switch 48 once closed, are mechanically held in their closed or operated position by conventional interlock means. Concurrently with the closure of contacts 48C, switch contacts 82 and 83, common to all selection switches are closed. These last-mentioned closures operate vend motor 60 over a circuit from lead L2 and motor 60 through contacts 83, 82, 135, conductor 222, closed contacts 94, conductor 214, and closed contacts 162 to lead L1. Over a generally similar path, selector controlled solenoid 80 is energized to close contacts 84 in shunt of contacts 82.

Vend motor 60, once operated, closes its cam actuated contacts 62 and 64. At contacts 64, the vend motor locks itself operated for the duration of its operative cycle. At contacts 62, a direct path is closed to timing motor 70. Timing motor 70 is thereby operated and closes its contacts 71 to lock itself operated. Parenthetically, it should be noted that contacts 71.1 open to reject all coins deposited during the operation of timing motor 70. The timing motor then continues its sequence at which time contact set 72 closes to shunt out relay 130. With relay 130 shunted out of the path to solenoid 58C, this solenoid will operate over the previously described path through wiper 22. Operation of this solenoid concurrently with the operation of the vend motor, causes a vend cycle to vend an article of the type represented by the switch position C.

The select solenoid 58C once energized, operates a mechanism, not shown, which controls the vending of the selected article and is physically restored at the conclusion of a vending cycle The vend cycle, once set into motion by the operation of the vend motor and the selected solenoid C of set 58, continues uninterruptedly to emit a selected article. The timing motor which must complete a number of cycles, one for each unit denomination to be subtracted, continues into the third period of its first subtract cycle. This timing period is initiated by the opening of contact set 72 and closing contact set 73. Contact set 73 closes a path to the subtract coil 44. This circuit may be followed from lead L2 through subtract coil 44, closed contacts 46, now closed contacts 73, conductor 222, contacts 94, lead 214, contacts 162 to lead L1.

As the timing motor moves from its third timing period into its fourth timing period, it first releases contacts 73 which cause the stepper wipers 22, 24, and 26 to step backwardly one step under the effect of the stepper escapement drive. By this time, relay 130 will have restored and the fourth period of the timing cycle will be entered.

With the wiper 22 resting on the $i$ contact of stationary set 40, a circuit is completed from lead L2 and 10¢ relay 110, over conductor 111, contact $i$ of set 40, wiper 22, contacts 98, commutator 32, the 5¢ price line 50, selection switch C, contacts 96, and lead 214 to lead L1. Relay 110 operates its contacts 112, 114, and 116. At contacts 112, a circuit is closed to 10¢ cut-off relay 120. Closure of contacts 114 has no effect on vend motor 60, as the motor is still passing through its single complete vend cycle. At contacts 116, the 10¢ payout solenoid is actuated through closed contacts 144 and 74, the latter closed during this fourth period. A dime is paid out by solenoid 118, and relay 120 operates through closed contacts 74.1, conductor 49, and contacts 45. Relay 120 locks itself operated over contacts 122 and opens contacts 124 in series with 5¢ payout solenoid 106. Thus, once a dime has been paid out, no nickels may thereafter be paid out.

The timing motor will then move into its fifth period closing contacts 75. With the escrow relay operated and escrow contacts 94 closed to conductor 222, the circuit to subtract coil 44 remains unoperated and the timing cycle thereby continues without producing other results. During this time, the vend motor, once actuated continues its cycle to emit the selected article The vend motor must retain contacts 62 closed either integrally or by the use of a slave time delay for the duration of the longest dispensing or credit subtraction period which in the embodiment shown extends for ten timing motor cycles A further timing cycle is started through the closed vend motor contacts 62. The timing cycle progresses through periods 1, 2, and 3. In this third period, subtract coil 44 is energized again, and then de-energized to step the wipers back one step before the fourth timing period. At that time, wiper 22 rests on the eighth or $h$ contact of set 40 and, although nickel relay 100 is energized, no nickel payout can occur due to the open circuit at lockout contacts 124.

Timing continues through the end of that cycle and into another cycle. In the third period of this cycle, subtract coil 44 is energized again and is released before the fourth period to step wiper 22 back onto $g$ contact of set 40. At this time, a circuit is completed to dime relay 110. Relay 110 closes contacts 116 to energize solenoid 118 to pay out a second dime. The timing cycle continues, ends, and a new cycle is started.

In the third period of this cycle, the subtract coil 44 is once again energized and thereafter wiper 22 is stepped back onto the $f$ contact of set 40 which is connected through conductor 101 to nickel relay 100. Due to the earlier lock operation of relay 120, no payout can occur during this cycle. A further timing cycle begins during which wiper 22 is stepped back to the $e$ contact during the third period. On the fourth period, on closure of contacts 74 concurrently with the closure of relay 130 over the $e$ contact of set 40, quarter solenoid 134 is energized to pay out a quarter. Cut-off relay 140 operates and locks itself operated to remove the possibility of subsequent 5¢ or 10¢ payout. At this time, two dimes and a quarter have been paid out and a vend cycle for a five-cent item is in progress. The purchaser has received all his change and the system must now home the stepper 20.

The timing cycle progresses into its fifth step, and a new timing cycle starts. In the third period, subtract coil 44 is energized and restored, the wiper 22 being stepped back onto the $d$ contact and relay 110. Nothing occurs due to the prior lock operations of relay 140 and the resultant open circuit at contacts 144. In combination with contacts 124 which are kept open by the continued operation of relay 120, these open contacts bar any further payout as timing cycles continue to step the wipers back through the $c$, $b$, and $a$ contacts to the home position. When the wipers have been homed, the subtract coil operating circuit is opened at contacts 46. At the conclusion of its cycle, the vend motor 60 restores its contacts 62 and 64 and the circuit remains at rest, awaiting further purchases.

In the third of the listed possible choices available to a purchaser, once 50¢ worth of credit has been stored, he may select a ten-cent article to be vended and receive 40¢ in change. He would, therefore, select an article represented by one of the selector switches A, E, F, I, or K of set 48 and receive his change in the form of one nickel, one dime, and one quarter.

With 50¢ worth of credit stored, wiper 22 rests on the tenth or $j$ contact, wiper 24 is resting on the ninth contact $i$, and wiper 26 is resting on the eighth or $h$ contact. Of these wiper connections, the connection of wiper 24 will be of prime importance since this wiper is the only one of these three which is connected to the source lead L1. This connection obviously is completed to wiper 24 through the 10¢ commutator 34 and the 10¢ price line 52. With credit stored, both relays 90 and 160 are operated and the stepper off-normal contacts 45 and 46 are in the operated position (opposite that shown).

Note that if at least 10¢ worth of credit had not been stored on the credit stepper, 10¢ price line wiper 24 would not be in engagement with any of the stationary contacts of set 40 and the vend circuit could not be operated through its vend cycle since neither relay 110, nor solenoid 58K could be operated at any time. In this way, the position contactors 22, 24, and 26 on set 40 assure that sufficient credit has been stored before vend can occur.

Assuming the purchaser wishes to select an item represented by selector switch K, he then actuates switch K of set 48. The actuation completes a path from lead L1 through contacts 162 closed to conductor 214, closed contacts 96, solenoid K of set 58, closed contacts of selector switch K of set 48, closed contacts 192, price line 52, commutator 34, wiper 24, $i$ contact of set 40, 10¢ denomination conductor 111, and 10¢ denomination relay 110 to lead L2. As previously discussed, solenoid 58K cannot operate over this path due to its impedance characteristics, but relay 110 does operate. Relay 110 closes its contacts 112, 114, and 116. At this time, only contacts 114 are effective and they close a path to the vend motor 60 as follows: Lead L2, vend motor 60, closed contacts 83, 82, 114, conductor 222, contacts 94, lead 214, contacts 162 to lead L1. The vend motor once energized locks itself operated over contacts 64 and initiates the operation of timing motor 70 through closed vend motor contacts 62. The vend motor on energization initiates its cycle to vend the selected item and the timing motor cycles to actuate the subtraction of credit.

In its operative period, timing motor 70 closes its contacts 71 to lock itself operated. In the second period, contacts 72 close to shunt out relay 110 and to thereby energize solenoid 58K to direct vending of a selected article. The timing cycle then progresses into its third period at which time the subtract coil 44 is energized through previously described circuit including contacts 94 and 162. The timing cycle then progresses toward its fourth period at which time contacts 73 open to restore the subtract coil 44, and step the wiper assemblies backwardly one step. Wiper 24 is now resting on the eighth or h contact and completes a circuit to 5¢ denomination relay 100 (relay 110 having restored on the wiper stepback). Relay 100 on operation closes its contacts 102 to complete a circuit from lead L1 through closed contacts 102 and 124 to nickel payout solenoid 106 and closed contacts 144 and 74. At this time, a nickel is paid out by solenoid 106 and the timing cycle progresses into the fifth period during which no activity occurs.

A new timing cycle is initiated over closed vend motor contacts 62. During the first period, the motor again locks itself operated. The cycle progresses through the second period which has no effect (other than during the first timing cycle of a vending sequence). In the period, contacts 73 reclose to energize subtract coil 44 once again. At the conclusion of this third period, coil 44 is de-energized and the wiper assembly is stepped back once again, so that wiper 24 is resting on the seventh or g contact of set 40. During this period, relay 110 is energized to energize the 10¢ payout solenoid 118 and to thereby pay out a dime in change. Concurrently, relay 120 is closed over a circuit through closed contacts 112, 74.1, conductor 49, contacts 45 and lead L1. Relay 120 locks itself operated, opens its contacts 124 to maintain an open circuit to the 5¢ solenoid 106 and prevent its subsequent operation.

This cycle continues, ends, and a new cycle starts, passes into the third period during which the subtract coil 44 is energized, and is thereafter released to step the wiper assembly back once again, the 10¢ wiper 24 now resting on the fifth or e contact of set 40. During the next timing period, a circuit is closed to quarter relay 130 to thereafter energize 25¢ payout solenoid 134. Energization of this solenoid causes a quarter to be paid out and causes contacts 136 to close and operate the 25¢ cut-off relay 140. Relay 140 locks itself operated to inactivate the dime and nickel payout solenoids for the duration of the dispensing cycle. By this time, one nickel, one dime, and one quarter have been paid out to the purchaser, and the selected article is in the process of being vended to him. The wiper assembly must thus step itself back to the home position with no further activity occurring.

The timing cycle in progress continues to its conclusion and a new timing cycle is started. In the third period of this cycle, subtract coil 44 is energized. Subtract coil 44 is de-energized after this period, and the wiper assembly steps backwardly one step, at which time the wiper 24 engages the d or fourth contact of set 40. This engagement completes a circuit to dime relay 110, but solenoid 118 is maintained inoperative at open contacts 144 by the retention of these contacts in the open condition by the lock operation of relay 140. Thus, no payout occurs and the timing cycle continues. In the subsequent timing cycles, the c, b, and a contacts are engaged by wiper 24, but no coin payout can occur due to the previously-mentioned open circuit at contacts 144. Thereafter, the wiper assemblies are stepped back until the wipers are resting in their home position. By the conclusion of this stepping operation, the article selected will have been vended and the circuit will restore itself to normal.

With the selection of a fifteen-cent item, once 50¢ worth of credit has been stored, the operation is quite similar to that previously described. The purchaser will depress a selector switch B, D, or J, depending on the article to be vended. Wiper 26 is the active one in this sequence and its wiper rests on the eighth or h contact of the set 40 when 50¢ worth of credit has been stored. Then vend motor operation is initiated in the manner previously described, and the timing cycle begins and passes into its second period to energize the selected solenoid of set 58. In the next period, the subtract coil 44 is energized and thereafter released to step the wiper assembly back one step placing wiper 26 on contact g of set 40. With the wiper in engagement with this contact, dime relay 110 is energized to initiate the operation of 10¢ payout solenoid 118 and to energize relay 120. A dime is thus paid out to the purchaser, and the payout of nickels is prevented by the continued operation of relay 120 and the resulting open set of contacts 124. In the next timing cycle, the wiper assembly is stepped back once again; wiper 26 engages the f contact of set 40, and no nickel payout can occur due to the open circuit at contacts 124. Timing cycle continues and the wiper assembly is stepped back, so that the wiper 26 engages the e or fifth contact. During this cycle, a quarter is paid out by the sequential operation of relay 130 and quarter payout solenoid 134. Relay 140 operates and opens its contacts 144 to prevent subsequent 10¢ and 5¢ payouts during this dispense cycle. The subsequent timing cycles will not produce any payout due to the previously described payout prevention and the wiper assembly will be stepped back to its home position as the selected article is vended.

The operation of the apparatus, when lesser amounts of credit are stored, is similar in principle to the operative cycles, previously explained, and need not be described further.

It can be seen that when the supply of quarters in the 25¢ payout tube is depleted to the extent that contacts 152 close, the 25¢ payout solenoid is by-passed and the 25¢ cut-off relay 140 cannot be energized due to the open circuit at contacts 136. Contacts 136, it should be remembered, are actuated by the 25¢ payout solenoid and these contacts must remain open if the 5¢ and 10¢ solenoids are to be energized. Assuming in the last-mentioned example that 50¢ worth of credit has been stored, a 15¢ article has been selected for vending and 35¢ change is to be returned, and that the quarter payout tube exhibits an empty condition. In this condition, contacts 152 close to lead 230 to shunt out the 25¢ payout solenoid 134. The vend operation is initiated and the timing cycles start. Wiper 26 which controls the dispensing cycle in a 15¢ vending operation rests on the eighth or h contact of set 40. In the third timing period, subtract coil 44 is energized and is thereafter released. Wiper 26 is stepped back from the h contact to the g contact. A circuit is completed to 10¢ denomination relay 110 through the g contact and conductor 111. This relay is energized and closes its contacts 112, 114, and 116.

With relay 110 operated at the start of the fourth timing period, relay 120 and dime payout solenoid 118 are energized. Solenoid 118 pays out a dime in change, and relay 120 locks itself operated for the duration of the dispense cycle. The timing cycle progresses, ends, and starts into the next timing cycle. Following the third timing period, wiper 26 is stepped back onto engagement with the sixth or f contact. This engagement energizes nickel relay 100 to close contacts 102. Relay 120 having locked its contacts 124 open, and with contacts 132 in the shunt path to nickel payout solenoid 106 remaining open, this 5¢ payout solenoid is not energized, and the cycle continues with no payout.

During the next timing cycle, wiper 26 steps onto the e or fifth contact to operate quarter relay 130. Operation of this relay closes its contacts 132 to complete the shunt path through contacts 152 and 5¢ payout solenoid 106 to closed contacts 144 and contacts 74. A nickel is then paid out by this shunt path operation of solenoid 106. In the next cycle, the wiper 26 is stepped back onto the *d* or fourth contact of set 40. A circuit is completed to relay 110 which is energized to initiate the operation of dime payout solenoid 118.

In the next cycle, the wiper 26 engages the third or *c* contact which is ineffective to achieve a result due to the locked closure of contacts 124 and the open alternate path at contacts 132. During the next timing cycle, with wiper 26 engaging contact *b* of set 40, another dime is paid out. In the next cycle, no payouts occur, and the wiper assembly is homed. In this operation, a dime was paid out, followed by one nickel and two dimes to reach the 35¢ total change necessary. Thus, it can be seen that when quarters are sufficiently depleted to close contacts 152 to conductor 231, change payout occurs with the substitution of one nickel and two dimes as payout in place of a quarter.

Similarly, when the 10¢ tube is depleted to the extent that contacts 150 switch from closure to dime relay 110 to an alternate closure to nickel relay 100, the lock operation of relay 120 cannot be effected and one nickel will be paid out in place of a dime when the active wiper engages a contact *b, d, g,* or *i* and conductor 111, while a second nickel is paid out by the alternate path operation by the adjacent contacts *a, c, f,* or *h,* engaging conductor 101. The payout of dimes normally occurs before quarter payout, hence, the prevention of payout of lesser denomination coins which follows quarter payout cannot occur until the two nickel payouts have occurred. The quarter operation and payout will in no way be changed by a depletion of dimes.

On depletion of the necessary amount of coins from the 5¢ tube, the proper change cannot be paid out in many instances. Closure of contacts 146 signifying that the 5¢ tube is sufficiently depleted, closes a circuit to a "Use Correct Change" lamp which warns the purchaser that insufficient change is available.

Figure 3:
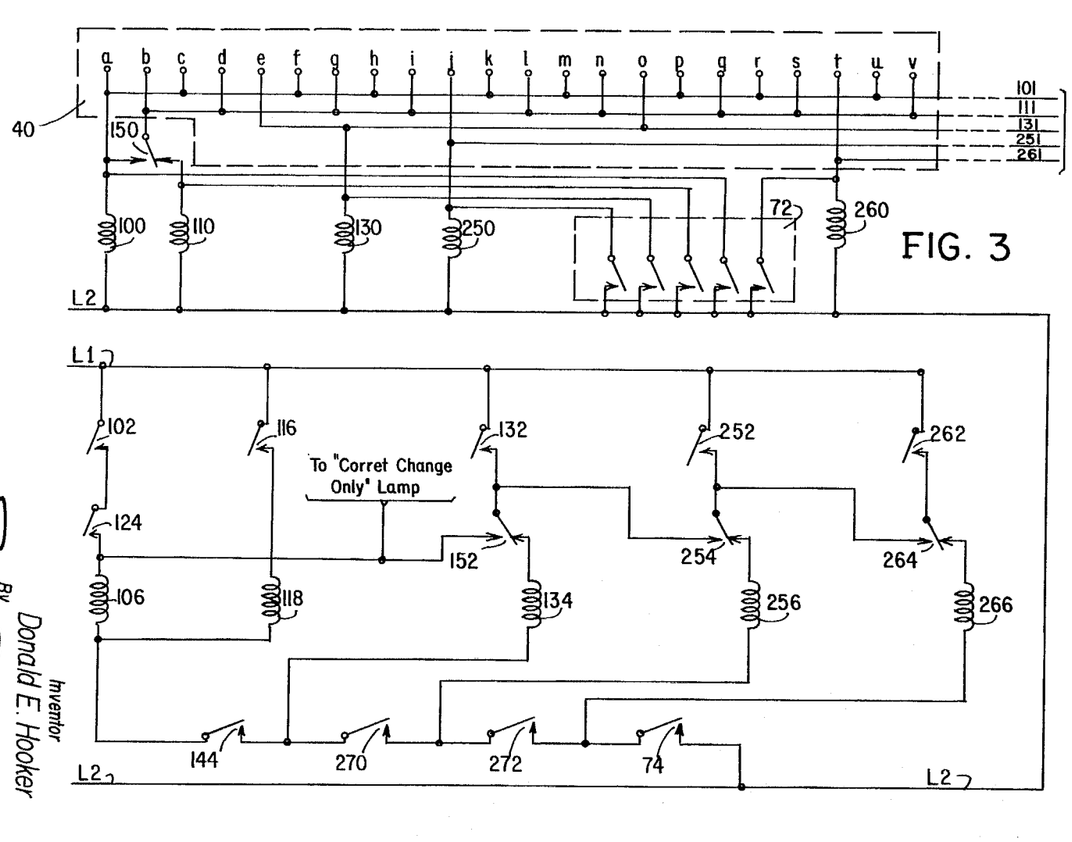
FIGURE 3 is a schematic representation of an enlargement of the capacity of the apparatus of FIGURES 1 and 2 to credit more than one dollar and to pay out change in 5¢, 10¢, 25¢, 50¢, and $1.00 denominations.

Now turning to the apparatus of FIGURE 3, there can be seen an enlarged capacity stepper with its many stationary contacts of set 40'. Set 40' includes a plurality of stationary contacts, twenty-two in number. Alternate ones of the stationary contacts of set 40' are connected to the various denomination conductors. Thus, contacts *a, c, f, h, k, m, p, r,* and *u* are connected to 5¢ denomination lead 101 and 5¢ denomination relay 100. Contacts *b, d, g, i, l, n, q, s,* and *v* are connected to 10¢ denomination conductor 111 and 10¢ denomination relay 110. Contacts *e* and *o* are connected to the 25¢ denomination conductor 131 and 25¢ denomination relay 130. The tenth contact of set 40' is connected to a 50¢ denomination relay 250 and 50¢ denomination lead 251. This relay controls a contact 252 in a series circuit through one contact path of 50¢ empty contact set 254 to a 50¢ payout solenoid 256. Relay 260 has contacts 262 normally open, which on relay operation close to $1.00 empty contacts 264 to a $1.00 payout solenoid 266. The twentieth contact *t* of set 40' is connected to a $1.00 denomination relay 260 and a $1.00 denomination conductor 261.

The 5¢, 10¢, and 25¢ denomination relays 100, 110, and 130, respectively, are similar to their counterparts in FIGURES 1 and 2, both as to their mode of operation and as to the contact closures which they control.

The added relays 250 and 260 control, in addition to the contacts shown, contact operating cut-off relays (not shown). These cut-off relays, act to remove the possibility of payout of lesser denomination change, in the manner previously described for the 10¢ cut-off relay 120 and the 25¢ cut-off relay 140. The 50¢ cut-off relay has contacts 270 in the circuit to payout solenoids 106, 118, and 138 for 5¢, 10¢, and 25¢ payout, respectively, and on opening contacts 270, these solenoids cannot operate when the 50¢ coin tubes contain change. A contact set 272 serves as the cut-off for amounts less than $1.00 by its position between timing contacts 74 and the payout solenoids for nickels, dimes, quarters, and half-dollars. Clearly, the switch and the contact progression could be expanded, as necessary, using the principle shown herein.

As mentioned previously, the operation of this circuit is similar in principle to that described for maximum quarter payout and is merely an expanded version of that circuit for high capacity credit and payout. It is, therefore, concluded that no added description of the operation of the circuit of FIGURE 3 is necessary in view of the prior explanation of the operation of the apparatus of FIGURES 1 and 2.

While there has been described what is at present thought to be the preferred embodiments of the invention, it will be understood that modifications may be made therein, and it is intended to cover in the appended claims all such modifications which fall within the true spirit and scope of the invention.

What is claimed is:

1. A control apparatus for a variable credit input system in which variable amounts of change are to be returned in the form of at least one of a plurality of different valued monetary elements,
   means for sensing the amount of change to be returned,
   a plurality of individual change return means, each representative of another one of said plurality of different valued elements,
   each of said change return means individually actuatable to return one of the elements represented thereby, and
   means operated consequent to said sensing for automatically actuating in succession the least number of said change return means in an ascending value to return the sensed amount of change.

2. A control apparatus for use in a credit system which pays out variable amounts of change, comprising:
   a coin registering mechanism including a first circuit completing member transferable to sequentially complete circuits representative of amounts of specific change to be paid out,
   means responsive to a circuit completion for determining the amount of change to be paid out,
   a first payout means actuatable to dispense a coin of a first denominational amount,
   a second payout means actuatable to dispense a coin of a second higher denominational amount,
   sensing means responsive to a representation of the amount of change to be paid out for automatically actuating said first payout means when the change to be paid out is a first denominational amount greater than said second denominational amount,
   means operative consequent to the actuation of said first payout means for transferring said circuit completing member for subtracting the amount paid out by said first payout means from the amount remaining to be paid out, and
   sensing means operative thereafter to determine the amount remaining to be paid out and to actuate a proper one of said payout means.

3. A change payout control apparatus for a machine operable by a variable cash input, comprising:
   a credit registering mechanism including a plurality of aligned stationary contacts and a plurality of motive contactors movable along the line of said stationary members to engage respective sequential ones of said contacts, and in which the position of one of said motive contactors along the line of stationary contactors determines the amount of credit registered,
   a first payout means actuatable to dispense a coin of unit denomination,
   a second payout means actuatable to dispense a coin of denomination in a multiple of said unit denomination,
   means responsive to the determination of the position of said contactors on said line of contacts for actuating said first payout means when the change to be paid out is a unit denomination larger than said multiple denomination, means operative thereafter for moving said motive contactors to reduce the determination of the amount of change to be paid out accordingly, further means responsive to said last-mentioned determination for thereafter actuating said second payout means, means responsive to the actuation of said second means for preventing further actuation of said first means, and means for causing the stepping of said contactors to zero credit registered during the actuation of said payout means.

4. A control apparatus for a coin actuated machine for vending a selected article at a sale price consequent to the deposit of credit at least equal to the sale price, including:

a coin register for determining the amount of credit deposited in said machine, coin return means actuatable to pay out the full amount registered, vend control means actuatable to dispense a selected article, means responsive to the actuation of said coin return means for debarring said vent control means against further actuation, a first payout mechanism operable for returning a coin of a first denomination, a second payout mechanism operable for returning a coin of a larger denomination, means responsive to a determination of the amount of credit registered to be paid out for operating one of said payout mechanisms, and further means responsive to a determination that the credit remaining after said payout mechanism operation is at least equal to said other denomination for operating said second mechanism.

5. A control apparatus for a coin actuated machine for merchandising a selected one of a plurality of articles, wherein said articles are merchandised at a plurality of sale prices in response to credit at least equal to the sale price having been deposited in the machine, including:

a coin register for determining an amount of credit deposited in said machine, coin return means actuatable to pay out the full amount registered, vend control means actuatable to dispense a selected article, means responsive to the actuation of said coin return means for debarring said vend control means against actuation during the return of the deposited price, a plurality of payout control mechanisms actuatable in succession individually for dispensing coins of increasing denomination, means responsive to a determination that the credit to be paid out is greater by an amount equal to the smallest of said denominations or by an amount equal to the smallest denomination greater than the amounts of said remaining denominations for actuating a first of said control payout mechanisms to dispense one coin of the smallest denomination, and further means determinative of the credit remaining for actuating the mechanisms to dispense successively equal or larger denominations until the full amount registered is paid out.

6. A control apparatus for a coin actuated machine for vending a selected one of a plurality of articles, wherein said articles are vended at a plurality of sale prices in response to credit at least equal to the sale price having been deposited in the machine, including:

a coin register for storing an amount of credit deposited in said machine, means for selecting one of said articles for vending, vend control means actuatable to dispense the selected article, means responsive to the actuation of said vend control means for reducing the amount of credit on said register by the sale price of the article selected, a plurality of individually actuatable payout control mechanisms for dispensing individual coins of increasing magnitude, and means responsive to a determination that credit remains in said register for automatically operating said mechanisms successively to dispense coins of increasing magnitude until the stored credit is removed.

7. In a coin actuated merchandising machine for vending articles at a plurality of sale prices and having a credit storage system for storing variable amounts of credit, comprising:

means operative to subtract a sale price from said stored credit, means for sensing the credit remainder after said subtraction, means responsive to said credit sensing for automatically paying out said credit remainder in a succession of payouts of one or more monetary denominations, comprising:

a plurality of individual payout control means, each representative of a different credit denomination, certain of said payout control means actuatable one or more times to cause the return of credit of the denomination represented thereby, preventive means operated on the actuation of a first one of said payout control means for preventing the payout control means representative of denominations below the value of the first payout control means from being actuated subsequent to actuation of said first payout control means, and means for continuing consequent actuation of the others of said payout means to complete the payout of said credit remainder in a minimum number of change payout means actuations.

8. In a coin actuated merchandising machine for vending a selected article at one of a plurality of sale prices and having a credit storage system for storing variable amounts of credit, comprising:

means for initiating the vending of a selected article, means operative to subtract the sale price of said vended article from said stored credit, means for sensing the credit remainder after said subtraction, and means automatically responsive to said sensing for initiating the payout of the credit remainder in a sucsection of payouts, comprising:

a plurality of individual payout control means, each representative of a different coin value, each of said payout control means actuatable individually to return a coin of the value represented thereby, and means operated in response to said sensing for automatically actuating in a plurality of sequential individual actuations the minimum number of actuations of said payout control means necessary to return the credit remainder.

9. In a machine as claimed in claim 8, coin sensing means associated with each of said payout control means for sensing the absence of coins of the value represented by the payout control means, and means responsive to the sensing of absence of coins of one or more of the higher values for actuating the payout control means representative of the lower valued coins to pay out said credit remainder in the proper number of lower valued coins.

10. In a machine receptive of cash in variable amounts for dispensing items therefrom, a credit control apparatus comprising:

a credit register responsive to the receipt of amounts of cash for storing said amounts accordingly in the form of credit, means operated consequent to the storage of credit for completing an operative network for dispensing an item therefrom, means controlled by said operative network on dispensing for reducing the credit stored on said register by an amount commensurate with the value of the dispensed item, means for sensing the amount of credit remaining on said register after said reduction, a plurality of payout control means, each representative of a different value coin and each actuatable to dispense a coin of its value, a first one of said payout control means actuatable automatically consequent to a sensing of credit remaining to dispense a coin of one value and for reducing the credit stored by the amount of said one value, other of said payout control means individually actuatable automatically in sequence thereafter to dispense individual coins of other value, further credit reducing means operable consequent to the actuation of any payout control means for reducing the stored credit by amounts equal to the value of the coins dispensed on said actuations, and means for blocking the actuation of said first payout control means only when the amount of credit remaining on said register can be paid out by higher valued coins.

11. In a machine as claimed in claim 10, said control apparatus further including means for sensing the absence of coins of one or more of said higher values available for coin dispensing for disenabling said blocking means whereby said remaining credit will be paid out in a combination of coins of the highest values available.

12. In a merchandising machine, a control apparatus for a variable credit input system in which selected articles at more than one sale price are to be vended and the difference between an amount of stored credit and a vend sale price is to be returned in coinage, a plurality of credit affecting elements, each representing one of said sale prices, manually operable means for selecting an article to be vended, means responsive to the operation of said selecting means and to the prior storage of credit at least of the amount of said sale price for initiating the vending of the selected article, further means responsive to the operation of said selecting means for activating the one credit affecting element representative of the sale price of the selected article to indicate the amount of credit remaining to be paid out in change after said sale, a plurality of individually actuatable coin dispensing means, each of said means actuatable to dispense coins of a different denomination, and means responsive to said indication for automatically completing successive circuits through said one credit affecting element to actuate in succession one or more of said coin dispensing means to return change through the minimum number of actuations of the coin dispensing means necessary to return said change.

13. A credit storage and payout control apparatus, comprising:

a bi-directional stepping switch having contactor means movable sequentially across credit determinative stationary contacts, wherein each of said contacts represents stored successive credit differing by a unit denomination from the adjacent contact, said contactor means movable in one direction to store credit and in the opposite direction to reduce credit, means operative consequent to an amount of credit having been stored for thereafter reducing the amount of stored credit, a first coin payout mechanism connected to respective ones of said contacts, a second coin payout mechanism connected to others of said contacts, each of said mechanisms actuatable individually in sequence to control dispensing of a coin of different denomination, said contactor means operatively positioned consequent to said reduction for completing a circuit to one of said contacts for actuating the mechanism connected thereto to dispense a coin of one denomination, means for moving said contactor means a number of contacts in the credit reduction direction equal to the denomination of the coin dispensed by said mechanism, and means for continuing the consequent actuation of one or both of said mechanisms in continuing sequence to complete the payout of remaining credit in a minimum number of mechanism actuations.

14. In a vending machine for vending selected items at a plurality of sale prices, a credit storage and payout control apparatus, comprising:

a bi-directional stepping switch having a plurality of contactors steppable sequentially to engage credit determinative stationary contacts, wherein successive contacts represent stored credit differing by a unit denomination, each of the contactors of said plurality representative of a different one of said sale prices, said contactors movable in one direction to store credit and in the opposite direction to reduce credit, means responsive to the selection of an item for energizing the one contactor representative of the sale price of the selected item to initiate vending of the selected item, cycle control means operative to step said plurality of contactors one step in the credit reducing direction whereby said one energized contactor engages the contact corresponding to the amount of credit stored reduced by the sale price of the item vended, a first coin payout mechanism connected to respective ones of said contacts, a second coin payout mechanism connected to others of said contacts, each of said mechanisms actuatable individually to control dispensing of a coin of different denomination, said energized contactor operative consequent to said reduction for completing a circuit to the engaged contact for actuating the mechanism connected thereto to dispense a coin, and means operative after said last-mentioned actuation for stepping said one contactor a number of successive contacts equal to the denomination of the coin dispensed by said actuated mechanism.

15. In a vending machine for vending selected items at a plurality of sale prices, a credit storage and payout control apparatus, comprising:

a bi-directional stepping switch having a plurality of contactors steppable sequentially to engage credit determinative stationary contacts, wherein successive contacts represent stored credit differing by a unit denomination, each of the contactors of said plurality representative of a different one of said sale prices, said contactors movable in one direction to store credit and in the opposite direction to reduce credit, means operative consequent to an amount of credit having been stored for initiating the vending of a selected item from said machine through a selected one of said contactors, means responsive to said initiation for energizing the one contactor representative of the sale price of the vended item and stepping said contactors one step in the credit reducing direction whereby said one energized contactor engages the contact corresponding to the amount of credit stored reduced by the sale price of the item vended, a plurality of coin payout control mechanism, each connected to respective ones of said contacts, each of said coin payout control mechanisms controlling a supply of coins of a different denomination, each said mechanism actuatable individually to return a coin of its denomination, said energized contactor operative consequent to said reduction for completing a circuit to the engaged contact for actuating the one of said mechanisms connected thereto to dispense a coin, means responsive to the actuation of said one mechanism to open the operating circuit to each of the payout control mechanisms controlling the supply of coins of lower denomination than said one mechanism, and cycle control means operative after said last-mentioned actuation for stepping said one contactor a number of contacts equal to the denomination of the coin dispensed by said one mechanism, and for actuating in sequence thereafter necessary payout mechanisms to reduce the stored credit to zero.

16. In a vending machine for vending a plurality of selected items at separate sale prices, a credit storage and payout control apparatus, comprising:

a credit stepper having a plurality of stationary contacts each successively determinative of an added unit of credit, a plurality of individual selectors each indicating an item to be sold, a plurality of spaced contactors movable jointly step-by-step across said contacts to indicate credit stored on said stepper, and to assure that sufficient credit is stored for a selection, each of said contactors representative of a different one of said sale prices and spaced a distance determined by the price difference between contactors, means at each of said selectors operable over the one contactor representative of the sale price of the item indicated by the selector to prepare for vending of the selected item, cycle control means for completing the vending of the item selected, means operated consequent to said vending for stepping said contactors to subtract a single unit of credit on said stepper, the one contactor positioned after said subtraction on the stationary contact indicating the amount of credit remaining to be paid out, a plurality of individual denomination payout means, each connected to selected ones of said stationary contacts and each payout means actuatable individually to pay out its denomination, a circuit completed to the one payout means connected to the stationary contact on which said one contactor is positioned to actuate said one payout means, means responsive to the actuation of said one payout means to open the circuit and lock against actuation all payout control means of denominations lower than said actuated one, means operated concurrent with the actuation of said one payout means to step the contactors one unit of credit, and means operative after said circuit opening for stepping the sale price contactor of the vended item a number of credit units equal to the denomination of the actuated payout means and for actuating in sequence necessary ones of said unlocked means to subtract all stored credit.

References Cited by the Examiner

UNITED STATES PATENTS

| | | | |
|---|---|---|---|
| 3,186,531 | 6/1965 | Adams | 194—10 |
| 3,190,426 | 6/1965 | Cahill et al. | 294—10 |

RAPHAEL M. LUPO, *Primary Examiner.*

STANLEY H. TOLLBERG, *Examiner.*